(12) United States Patent
Faletti et al.

(10) Patent No.: US 6,439,210 B1
(45) Date of Patent: Aug. 27, 2002

(54) EXHAUST GAS REPROCESSING/ RECIRCULATION WITH VARIABLE VALVE TIMING

(75) Inventors: James J. Faletti, Spring Valley; Steven J. Funke, Princeville, both of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/615,068

(22) Filed: Jul. 12, 2000

(51) Int. Cl.$^7$ ............................................... F02M 25/07
(52) U.S. Cl. .................................................. 123/568.14
(58) Field of Search ..................... 123/568.14, 295, 123/430, 90.11, 90.15

(56) References Cited

U.S. PATENT DOCUMENTS

| | | |
|---|---|---|
| 4,357,917 A | 11/1982 | Aoyama |
| 4,724,809 A * | 2/1988 | Burandt ....................... 123/430 |
| 5,224,460 A | 7/1993 | Havstad et al. |
| 5,357,936 A | 10/1994 | Hitomi et al. |
| 5,367,990 A | 11/1994 | Schechter |
| 5,379,743 A | 1/1995 | Stokes et al. |
| 5,404,844 A | 4/1995 | Schechter |
| 5,425,346 A | 6/1995 | Mavinahally |
| 5,666,931 A | 9/1997 | Pierik et al. |
| 5,682,854 A | 11/1997 | Ozawa |
| 5,711,154 A | 1/1998 | Baechle et al. |
| 5,713,315 A | 2/1998 | Jyoutaki et al. |
| 6,205,975 B1 * | 3/2001 | Ruedin et al. .............. 123/322 |
| 6,234,123 B1 * | 5/2001 | Liyama et al. ........... 123/90.15 |

* cited by examiner

Primary Examiner—Andrew M. Dolinar
Assistant Examiner—Arnold Castro
(74) Attorney, Agent, or Firm—Taylor & Aust. P.C.

(57) ABSTRACT

Apparatus and method, particularly suited for a work machine, provides EGR to an internal combustion engine without the addition of special EGR hardware. The invention provides a controlling of a timing of the closing of a first exhaust valve during the exhaust stroke of a first cylinder to trap exhaust gas in the first cylinder for mixing with combustion air in the first cylinder during the intake stroke.

14 Claims, 3 Drawing Sheets

EXHAUST GAS REPROCESSING/RECIRCULATION WITH VARIABLE VALVE TIMING

TECHNICAL FIELD

The present invention relates to an exhaust gas recirculation system for an internal combustion engine, and, more particularly, to an exhaust gas reprocessing/recirculation system having variable valve timing.

BACKGROUND ART

An exhaust gas recirculation (EGR) system is used for controlling the generation of undesirable pollutant gases and particulate matter in the operation of internal combustion engines. Such systems have proven particularly useful in internal combustion engines used in motor vehicles such as passenger cars, light duty trucks, and other on-road motor equipment.

EGR systems primarily recirculate the exhaust gas by-products into the intake air supply of the internal combustion engine. The exhaust gas which is reintroduced to the engine cylinder reduces the concentration of oxygen therein, which in turn lowers the maximum combustion temperature within the cylinder and slows the chemical reaction of the combustion process, decreasing the formation of nitrous oxides (NOx). Furthermore, the exhaust gases typically contain unburned hydrocarbons which are burned on reintroduction into the engine cylinder, which further reduces the emission of exhaust gas by-products which would be emitted as undesirable pollutants from the internal combustion engine.

Some internal combustion engines include turbochargers to increase engine performance, and are available in a variety of configurations. When utilizing EGR in a turbocharged diesel engine, the exhaust gas to be recirculated is preferably removed upstream of the exhaust gas driven turbine associated with the turbocharger. In many EGR applications, the exhaust gas is diverted by a poppet-type EGR valve directly from the exhaust manifold. The percentage of the total exhaust flow which is diverted for introduction into the intake manifold of an internal combustion engine is known as the EGR rate of the engine.

The reintroduction of exhaust gases will occur naturally when the exhaust manifold pressure is higher than the turbocharger boost pressure. In a low pressure system, the pressure difference simply pushes the exhaust gas into the intake air before the turbocharger compressor. The disadvantage of this approach is the potential fouling of the turbocharger compressor and the air-to-air intercooler of the engine, if so equipt.

High pressure systems typically pump exhaust gas directly into the intake manifold of the engine. However, when such a turbocharged engine operates under lower speed and high torque conditions, the boost pressure is higher than the exhaust manifold pressure and recirculation of exhaust gases is not possible. Earlier approaches to address this problem have included using devices such as back pressure valves, restrictive turbines, throttle valves and venturi inlet systems. Each can be used to improve the back pressure to boost pressure gradient to some degree, but each approach results in increased fuel consumption.

Another approach in reducing exhaust gas emissions, as disclosed in U.S. Pat. No. 5,404,844, is to use a camless engine valve systems and operating method to eliminate the need for external exhaust gas recirculation. In such a system, the engine valves are hydraulically or electrically controlled to vary the valve lift schedule for various engine operating conditions. During part load operation of the engine, the intake valve is opened and the exhaust valve is closed during the exhaust stroke, prior to a piston's top dead center position, so that the intake port receives exhaust gas, which is then returned to the cylinder during the intake stroke to eliminate the need for an external exhaust gas recirculation system. Such an approach, however, can be limited in its ability to supply a full range of EGR to the engine.

The present invention is directed to overcoming one or more of the problems or limitations set forth above.

DISCLOSURE OF THE INVENTION

In one aspect of the invention, an internal combustion engine has a block defining a plurality of combustion cylinders, the plurality of combustion cylinders having a first cylinder having at least an exhaust stroke followed by an intake stroke. A cylinder head is in fluid communication with the first cylinder, the cylinder head having a first exhaust valve corresponding to the first cylinder and a first intake valve corresponding to the first cylinder. An intake manifold is fluidly connected to the plurality of combustion cylinders to supply combustion air thereto. An exhaust manifold is fluidly connected to the plurality of combustion cylinders to receive exhaust gas therefrom. An apparatus controls a timing of the closing of the first exhaust valve during the exhaust stroke of the first cylinder to trap exhaust gas in the first cylinder for mixing with the combustion air in the first cylinder during the intake stroke.

Thus, the invention provides EGR to an internal combustion engine without the addition of special EGR hardware.

BEST MODE FOR CARRYING OUT THE INVENTION

Figure 1:
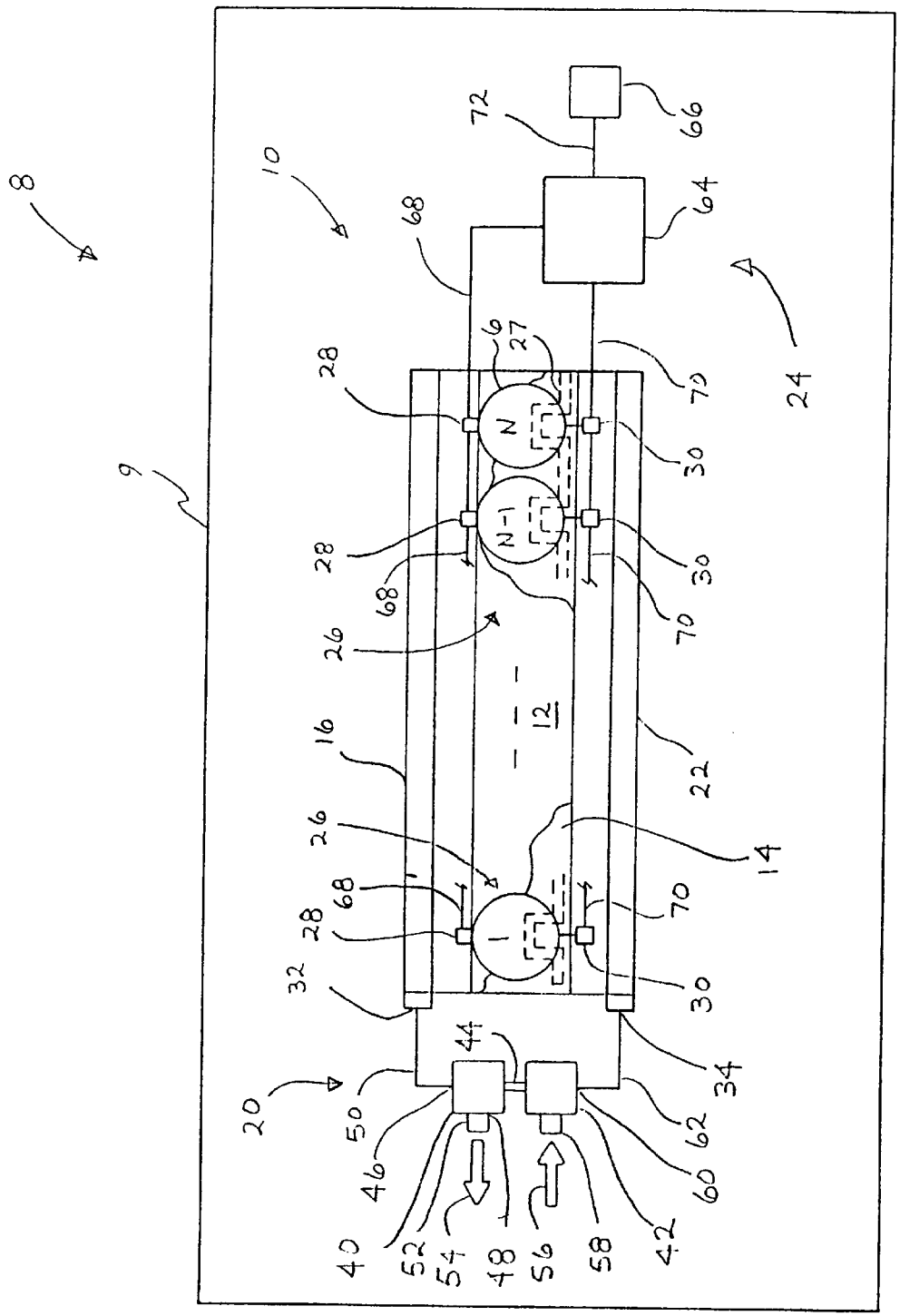
FIG. 1 is a schematic illustration of an internal combustion engine of the present invention.

Referring to FIG. 1, there is shown a schematic representation of a work machine 8 having a frame 9 to which an internal combustion engine 10 of the present invention is attached. Internal combustion engine 10 generally has a block 12, a cylinder head 14, an exhaust manifold 16, a turbocharger 20, and an intake manifold 22 and a variable valve timing control system 24.

Block 12 defines a plurality of combustion cylinders 26 individually identified as cylinders 1-to-N. The number N of combustion cylinders 26 may be selected dependent upon a specific application. For example, block 12 may include six, ten or twelve combustion cylinders 26, in which case N=6, 10, or 12, respectively. Each combustion cylinder 26 has a displacement volume which is the volumetric change within each combustion cylinder 26 as an associated piston (not shown) moves from a bottom dead center to a top dead center position, or vice versa, in relation to the rotational position (crank angle) of a crankshaft 27. The displacement volume may be selected dependent upon the specific application of internal combustion engine 10. The sum of the displacement volumes for each of combustion cylinders 26 defines a total displacement volume for internal combustion engine 10.

Cylinder head 14 is connected to block 12 in a manner known to those skilled in the art, and is shown with a section broken away to expose block 12. As each of the pistons moves to its respective top dead center position, each piston and the cylinder head 14 define a combustion chamber therebetween. In the embodiment shown, cylinder head 14 is a single cylinder head and includes a plurality of exhaust valves 28 and a plurality of intake valves 30, which preferably are individually controlled. Each of exhaust valves 28 and intake valves 30 are movable between an open position and a closed position. Exhaust valves 28 and intake valves 30 each include a means for controlling an opening and closing. An example of such means is an actuator, such as an electrically controlled hydraulic actuator, i.e., an electro-hydraulic actuator. Alternatively, valves being electrically controlled and/or solenoid actuated could be used.

Exhaust manifold 16 and intake manifold 22 are connected to cylinder head 14, and are fluidly coupled to the plurality of combustion cylinders 26.

Exhaust manifold 16 includes cylinder ports fluidly connected to receive combustion products from cylinders 1-to-N of combustion cylinders 26. Exhaust manifold 16 includes an exhaust outlet port 32. Intake manifold 22 includes a combustion air intake port 34.

Turbocharger 20 has a turbine 40 and a compressor 42. Turbine 40 is driven by the exhaust gases which flow from exhaust outlet port 32 of exhaust manifold 16. Turbine 40 is coupled with compressor 42 via a shaft 44 and rotatably drives compressor 42. Turbine 40 includes an exhaust gas inlet 46 and an exhaust gas outlet 48. Exhaust gas inlet 46 is connected to exhaust outlet port 32 of exhaust manifold 16 via fluid conduit 50. Exhaust gas outlet 48 of turbine 40 is connected to an exhaust pipe 52, which in turn is in fluid communication with the atmosphere for expelling exhaust gases, as depicted by arrow 54.

Compressor 42 receives combustion air (as indicated by arrow 56) through compressor inlet 58 from the ambient environment and provides compressed combustion air through compressor outlet 60 via fluid conduit 62 to combustion air intake port 34 of intake manifold 22. Alternatively, an air cooler (not shown) may be inserted between compressor 42 and air intake port 34 to cool the combustion air prior to delivery to intake manifold 22.

Variable valve timing control system 24 includes a controller 64 and a sensor assembly 66. As shown in FIG. 1, controller 64 is electrically connected to exhaust valves 28 via an actuator wire 68. Controller 64 is electrically connected to intake valves 30 via an actuator wire 70.

In one embodiment, controller 64 is an electrical controller which has a microprocessor having an associated memory, and has preprogrammed instructions and look-up tables stored in the memory. The preprogrammed instructions can be modified by connecting controller 64 to an input device (not shown), such as a key pad or key board. Controller 64 is electrically coupled to sensor assembly 66 via an electrical cable 72.

Industrial Applicability

In the use examples that follow, it is assumed for purposes of discussion that internal combustion engine 10 is a six cylinder engine, i.e., having combustion cylinders 1-to-(N= 6). Also, the variable valve timing control profiles graphically illustrated in FIGS. 2–5 show the valve timing of one cylinder of internal combustion engine 10, but are applicable to any of the cylinders 26. In each of FIGS. 2–5, the horizontal axis represents the crank angle in degrees, and the vertical axis represents valve lift in inches. Also, the movement of the intake valve is depicted by a dashed line, while the movement of the exhaust valve is depicted by a solid line.

For ease of understanding the invention, however, the discussion that follows focuses on the variable valve timing for the 6th cylinder of internal combustion engine 10. The 6th cylinder of the plurality of combustion cylinders 26 will be referred to as cylinder 6. While at times the invention is described below by exemplifications specific to cylinder 6, those skilled in the art will recognize that the invention can be adapted to use a cylinder other than the 6th cylinder, or adapted to apply to multiple cylinders of cylinders 26, or all the cylinders 26, of internal combustion engine 10.

During use, controller 64 receives sensor output signals from sensor assembly 66 via electrical cable 72, and executes the preprogrammed instructions to effect the generation of appropriate valve timing signals for use in controlling the timing of valve opening and/or valve closing for cylinders 1-to-6 of combustion cylinders 26. Preferably, controller 64 has look-up tables which correlate the sensor output signals to at least one of the variable valve timing control profiles graphically illustrated in FIGS. 2–5, which in turn is used in generating valve actuation signals. The valve actuation signals are supplied to exhaust valves 28 via actuator cable 68, and to intake valves 30 via actuator cable 70, to control the opening and closing of exhaust valves 28 and intake valves 30 of internal combustion engine 10 to effect exhaust gas reprocessing and/or recirculation by internal combustion engine 10. Within any of the valve timing profiles illustrated in FIGS. 2–5, the timing of the opening and closing of exhaust valve(s) 28 and intake valve(s) 30 can be varied by controller 64 based on sensor output signals received from sensor assembly 66.

As will be more apparent in the discussion that follows, reprocessing of exhaust gas in a cylinder occurs by trapping the exhaust gas in the cylinder, rather than by supplying exhaust gas to the intake manifold as in traditional exhaust gas recirculation. However, to simplify the discussion, both exhaust gas recirculation and exhaust gas reprocessing will be referred to as EGR.

Sensor assembly 66 is adapted to monitor, for example, one or more of the rotational position (crank angle) of crankshaft 27, $CO_2$ content of exhaust gas, $NO_x$ content of exhaust gas, temperature of exhaust gas, intake manifold pressure, intake manifold temperature, engine speed, and altitude.

FIGS. 2–5 graphically illustrate the variable valve timing control profiles of the exhaust valve 28 and intake valve 30 for one of the plurality of combustion cylinders 26, such as cylinder 6, with respect to the crank angle of crankshaft 27 to effect exhaust gas reprocessing and/or exhaust gas recirculation by internal combustion engine 10.

Figure 2:
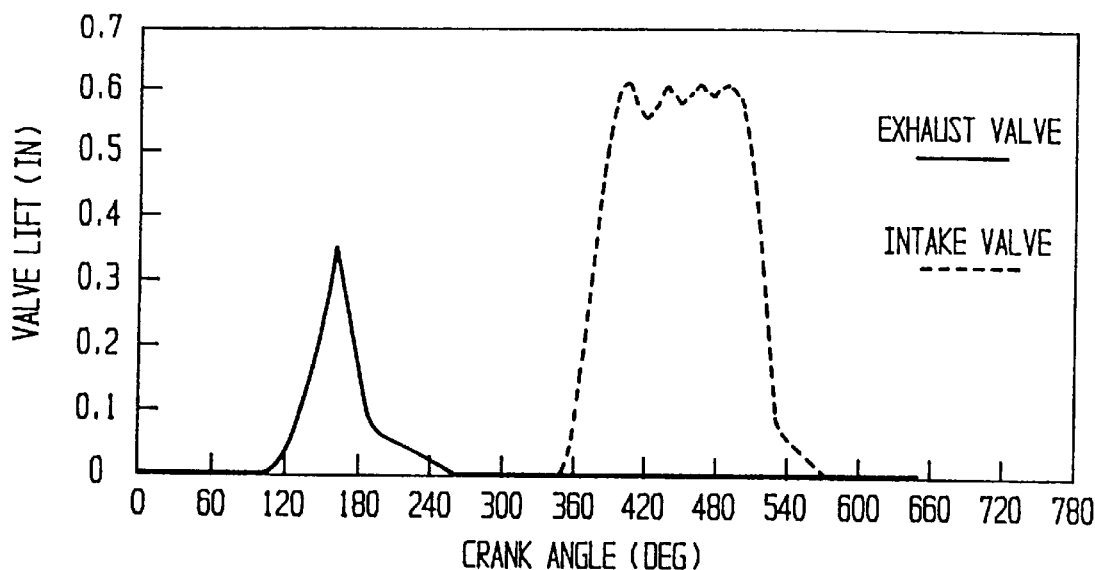
FIG. 2 is a graphical illustration of a valve timing profile of the invention.

Referring to FIG. 2, EGR is effected by trapping some of the exhaust gas in cylinder 6 by closing exhaust valve 28 of cylinder 6 early during the exhaust stroke of cylinder 6.

Under operating conditions with no EGR, during the exhaust stroke of cylinder 6 exhaust valve 28 of cylinder 6 begins to open at a crankshaft rotational position (crank angle) of about 100 degrees, achieves a full open position at about 180 degrees, begins to close at about 260 degrees and is fully closed at about 380 degrees. Also, under operating conditions with no EGR, during the intake stroke of cylinder 6 intake valve 30 of cylinder 6 begins to open at a crankshaft rotational position of about 340 degrees, achieves a full open position at about 380 degrees, begins to close at about 500 degrees and is fully closed at about 560 degrees.

In the example shown in FIG. 2, exhaust valve 28 of cylinder 6 begins to open at a crankshaft rotational position of about 100 degrees, but begins to close at about 160 degrees, and is fully closed at about 260 degrees. Accordingly, not all exhaust gas in cylinder 6 escapes during the exhaust stroke, and some of the exhaust gas is trapped in cylinder 6. During the following intake stroke, combustion air is received into cylinder 6 which mixes with the trapped exhaust gas in cylinder 6, and thereafter is ignited along with injected fuel.

By varying the timing of the closing of exhaust valve 28 during the exhaust stroke of cylinder 6, the amount of exhaust gas which is trapped in cylinder 6 can be varied. Accordingly, controller 64 selectably varies the timing of the closing of exhaust valve 28 during the exhaust stroke of cylinder 6 to select the desired amount of exhaust gas to be trapped in cylinder 6 to effect the desired amount of exhaust gas reprocessing based upon the sensor output signals received from sensor assembly 66.

Figure 3:
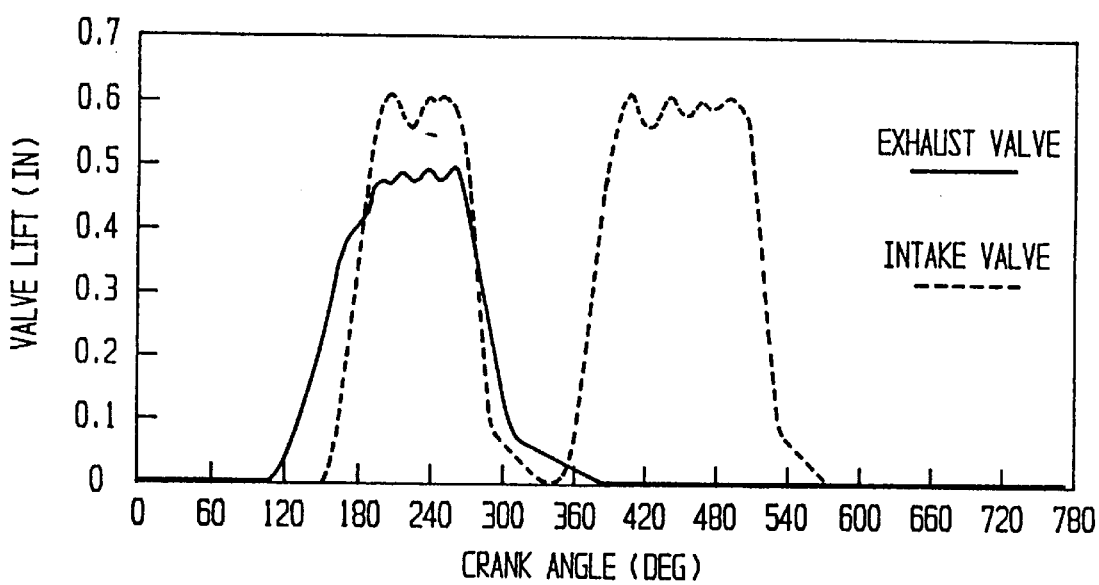
FIG. 3 is a graphical illustration of another valve timing profile of the invention.

Referring to FIG. 3, EGR is effected by opening intake valve 30 of cylinder 6 while exhaust valve 28 of cylinder 6 is open, i.e., not closed. Using the valve timing profile depicted in FIG. 3, a portion of the exhaust gas from cylinder 6 is supplied directly to intake manifold 22 during the exhaust stroke of cylinder 6 for mixing with combustion air received into intake manifold 22.

In the example shown in FIG. 3, exhaust valve 28 of cylinder 6 begins to open at a crankshaft rotational position of about 100 degrees, achieves a full open position at about 180 degrees, begins to close at about 260 degrees and is fully closed at about 380 degrees. Also, intake valve 30 of cylinder 6 begins to open at a crankshaft rotational position of about 150 degrees, achieves a full open position at about 180 degrees, begins to close at about 260 degrees and is fully closed at about 340 degrees.

By varying the timing of the opening and closing of intake valve 30 of cylinder 6 during the exhaust stroke of cylinder 6 while exhaust valve 28 of cylinder 6 is not closed, the amount of exhaust gas which is recirculated from cylinder 6 to intake manifold 22 is varied. Accordingly, controller 64 selectably varies the timing of the opening and closing of intake valve 30 during the exhaust stroke of cylinder 6 to select the desired amount of exhaust gas to be recirculated to effect the desired amount of EGR based upon the sensor output signals received from sensor assembly 66.

Figure 4:
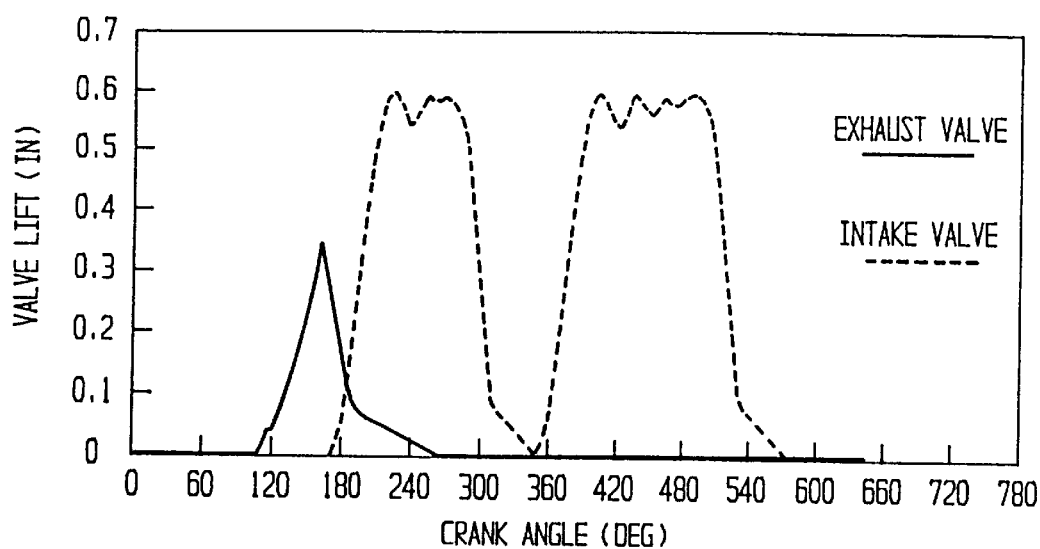
FIG. 4 is a graphical illustration of another valve timing profile of the invention.

Referring to FIG. 4, EGR is effected by a combination of the control methods described above with respect to FIGS. 2 and 3. This combined method can provide more EGR than either of the valve timing methods of FIGS. 2 and 3 individually.

In the example shown in FIG. 4, exhaust valve 28 of cylinder 6 begins to open at a crankshaft rotational position of about 100 degrees, but begins to close at about 160 degrees, and is fully closed at about 260 degrees. In addition, intake valve 30 of cylinder 6 begins to open at a crankshaft rotational position of about 150 degrees, achieves a full open position at about 180 degrees, begins to close at about 260 degrees and is fully closed at about 340 degrees.

Thus, during the exhaust stroke of cylinder 6, EGR is effected by the early closing of exhaust valve 28 of cylinder 6 and the opening and closing of intake valve 30 of cylinder 6, both events occurring during the normal range of opening and closing of exhaust valve 28 of cylinder 6, i.e., between about 100 degrees and about 380 degrees of the crankshaft rotational position. Accordingly, controller 64 selectably varies the timing of the opening and closing of both exhaust valve 28 and intake valve 30 during the exhaust stroke of cylinder 6 to select the desired amount of exhaust gas to be recirculated to effect the desired amount of EGR based upon the sensor output signals received from sensor assembly 66.

Figure 5:
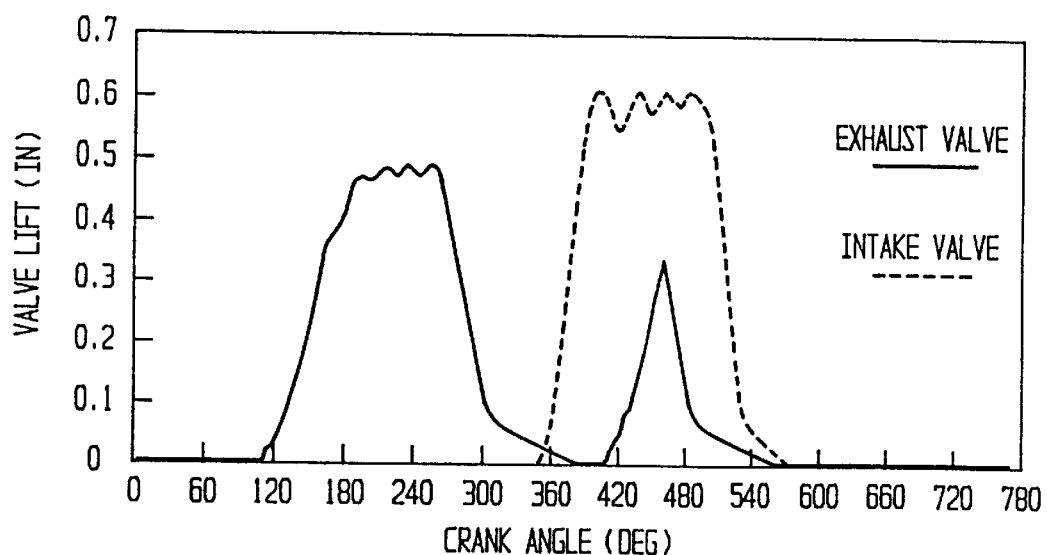
FIG. 5 is a graphical illustration of another valve timing profile of the invention.

Referring to the FIG. 5, EGR is effected by opening and closing exhaust valve 28 of cylinder 6 during the intake stroke of cylinder 6.

In the example shown in FIG. 5, during the intake stroke of cylinder 6 intake valve 30 of cylinder 6 operates normally and begins to open at a crankshaft rotational position of about 340 degrees, achieves a full open position at about 380 degrees, begins to close at about 500 degrees and is fully closed at about 560 degrees.

To effect EGR, during the intake stroke of cylinder 6 exhaust valve 28 of cylinder 6 begins to open at a crankshaft rotational position of about 400 degrees, begins to close at about 460 degrees, and is fully closed at about 560 degrees. Accordingly, controller 64 selectably varies the timing of the opening and closing of exhaust valve 28 during the intake stroke of cylinder 6 while intake valve 30 of cylinder 6 is open. This selects the desired amount of exhaust gas to be recirculated from exhaust manifold 16 to cylinder 6 to effect the desired amount of EGR based upon the sensor output signals received from sensor assembly 66.

Thus, the present invention effects EGR without the addition of special EGR hardware. By controlling the EGR by one or more of the variable valve timing profiles illustrated by example in FIGS. 2–5, a full range of EGR is available and the EGR rate can be controlled to select the desired amount of EGR based on monitored operating conditions. Also, the present invention can be applied to any cylinder, any combination of cylinders, or all the cylinders of the internal combustion engine.

Other aspects, objects and advantages of this invention can be obtained from a study of the drawings, the disclosure and the appended claims.

What is claimed is:

1. A work machine having a frame, said work machine comprising:

an internal combustion engine attached to said frame;

a block being a part of said internal combustion engine, said block defining a plurality of combustion cylinders, said plurality of combustion cylinders having a first cylinder having at least an exhaust stroke and an intake stroke;

a cylinder head being a part of said internal combustion engine, said cylinder head being in fluid communication with said first cylinder, said cylinder head having a first exhaust valve corresponding to said first cylinder and a first intake valve corresponding to said first cylinder;

an intake manifold being a part of said internal combustion engine, said intake manifold being fluidly connected to said plurality of combustion cylinders to supply combustion air thereto;

an exhaust manifold being a part of said internal combustion engine, said exhaust manifold being fluidly connected to said plurality of combustion cylinders to receive exhaust gas therefrom; and an apparatus which controls a timing of the closing of said first exhaust valve during said exhaust stroke of said first cylinder to trap exhaust gas in said first cylinder for mixing with said combustion air in said first cylinder during said intake stroke, said apparatus controlling an opening and a closing of one of said first intake valve during said exhaust stroke of said first cylinder and said first exhaust valve during said intake stroke of said first cylinder.

2. The work machine of claim 1, said apparatus including a controller in communication with said first exhaust valve.

3. The work machine of claim 2, said apparatus having a sensor assembly in electrical communication with said controller, said sensor assembly supplying sensor output signals to said controller.

4. The work machine of claim 1, said first cylinder being any one of said plurality of combustion cylinders.

5. The work machine of claim 1, wherein said apparatus controls a timing of an opening and a closing of said first intake valve during said exhaust stroke of said first cylinder while said first exhaust valve of said first cylinder is not closed.

6. An internal combustion engine, comprising:
   a block defining a plurality of combustion cylinders, said plurality of combustion cylinders having a first cylinder having at least an exhaust stroke and an intake stroke;
   a cylinder head in fluid communication with said first cylinder, said cylinder head having a first exhaust valve corresponding to said first cylinder and a first intake valve corresponding to said first cylinder;
   an intake manifold fluidly connected to said plurality of combustion cylinders to supply combustion air thereto;
   an exhaust manifold fluidly connected to said plurality of combustion cylinders to receive exhaust gas therefrom; and
   an apparatus which controls a timing of the closing of said first exhaust valve during said exhaust stroke of said first cylinder to trap exhaust gas in said first cylinder for mixing with said combustion air in said first cylinder during said intake stroke, said apparatus controlling an opening and a closing of one of said first intake valve during said exhaust stroke of said first cylinder and said first exhaust valve during said intake stroke of said first cylinder.

7. The internal combustion engine of claim 6, said apparatus having a controller in communication with said first exhaust valve.

8. The internal combustion engine of claim 7, said apparatus having a sensor assembly in electrical communication with said controller, said sensor assembly supplying sensor output signals to said controller.

9. The internal combustion engine of claim 6, said first cylinder being any one of said plurality of combustion cylinders.

10. The internal combustion engine of claim 6, wherein said apparatus controls a timing of an opening and a closing of said first intake valve during said exhaust stroke of said first cylinder while said first exhaust valve of said first cylinder is not closed.

11. A method for providing EGR in an internal combustion engine having a first cylinder having at least an exhaust stroke and an intake stroke, a first exhaust valve corresponding to said first cylinder, and a first intake valve corresponding to said first cylinder, comprising the steps of:
    controlling a timing of the closing of said first exhaust valve during said exhaust stroke of said first cylinder to trap exhaust gas in said first cylinder;
    controlling a timing of an opening and a closing of one of said first intake valve during said exhaust stroke of said first cylinder and said first exhaust valve during said intake stroke of said first cylinder; and
    mixing said exhaust gas trapped in said first cylinder with combustion air in said first cylinder during said intake stroke.

12. The method of claim 11, including the step of providing a controller in communication with said first exhaust valve.

13. The method of claim 12, including the step of supplying sensor output signals to said controller.

14. The method of claim 11, including the step of controlling a timing of an opening and a closing of said intake valve during said exhaust stroke of said first cylinder while said first exhaust valve of said first cylinder is not closed.

* * * * *